No. 761,014. PATENTED MAY 24, 1904.
E. SHUPE.
TOASTER.
APPLICATION FILED NOV. 6, 1903.
NO MODEL.
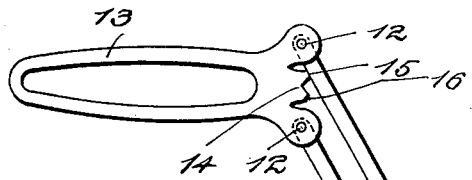
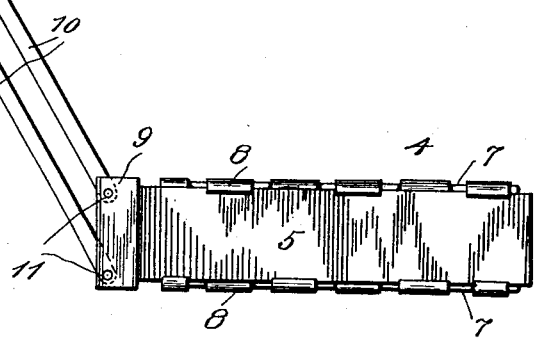
Fig. 1.
Fig. 2.
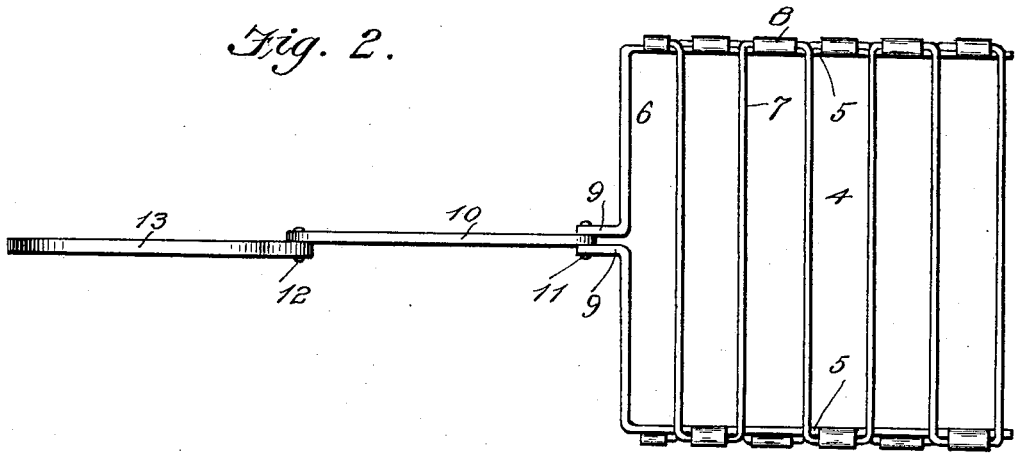
WITNESSES
F. A. Parron
W. A. Schmidt
INVENTOR
Eli Shupe
by Milo B. Stevens & Co. Attys.
THE NORRIS PETERS CO., PHOTO-LITHO., WASHINGTON, D. C.

No. 761,014. Patented May 24, 1904.

UNITED STATES PATENT OFFICE.

ELI SHUPE, OF RACINE, WISCONSIN, ASSIGNOR TO PETER O. WEBERG AND JOHN McKUNE, OF RACINE, WISCONSIN.

TOASTER.

SPECIFICATION forming part of Letters Patent No. 761,014, dated May 24, 1904.

Application filed November 6, 1903. Serial No. 180,114. (No model.)

*To all whom it may concern:*

Be it known that I, ELI SHUPE, a citizen of the United States, residing at Racine, in the county of Racine and State of Wisconsin, have invented new and useful Improvements in Toasters, of which the following is a specification.

My invention relates to improvements in toasters, and has for its object a simple and convenient utensil of this kind.

A further object is to provide a construction whereby the utensil is readily reversed to present both sides of the article of food to the heat.

With these objects in view the invention consists in certain novel features of construction hereinafter described and claimed, and shown in the accompanying drawings, in which—

Figure 1 is a side elevation. Fig. 2 is a top plan view thereof.

Referring to the drawings, 4 indicates the holder which receives the article of food to be toasted. It comprises a frame having oppositely-disposed sides 5 and a rear end portion 6. A wire grating 7 extends across the sides 5, at the top and bottom thereof, between which the article is placed. The wires are secured to the sides in ears 8, formed on the edges thereof, and the frame is open in front to permit the article to be placed between the grating. The frame is preferably formed of two strips of sheet metal of suitable width and thickness, which are bent to form the sides and the end portions, as shown in Fig. 2. At the middle of the end portion 6 the strips are bent outwardly to form parallel flanges 9, between which vertically-spaced parallel bars 10 are pivoted at 11. The outer ends of the bars are pivoted at 12 to a handle 13. A projection 14 is formed on the handle and extends between the connecting-bars 10 for a purpose to be described.

When the utensil is grasped by the handle, the connecting-bars will cause the holder to extend in a horizontal plane below the handle, as shown in Fig. 1, removing all danger of burning the hand. When it is desired to reverse the holder to present the opposite side of the article therein to the heat, it is necessary only to reverse the handle, the connecting-bars causing the holder to resume its horizontal position below the handle.

The projection 14 is so located between the connecting-bars that one of its sides 15 will engage the inner edge of the upper one of said bars. This prevents the bars from swinging downwardly too far, and thus holds them at a proper angle with respect to the handle. When the utensil is reversed, the other bar will be the upper one and will be engaged by the other side, 16, of the projection.

Having thus described my invention, what is claimed as new, and desired to be secured by Letters Patent, is—

1. A toaster comprising a holder, a handle, spaced parallel connecting-bars pivoted to the holder and handle, and a stop to limit the downward swing of the connecting-bars.

2. A toaster comprising a holder, a handle, vertically-spaced parallel connecting-bars pivoted to the holder and handle, and a projection on the handle extending between the bars and engaged thereby to limit their downward swing.

In testimony whereof I have signed my name to this specification in the presence of two subscribing witnesses.

ELI SHUPE.

Witnesses:
  HENRY E. MILLER,
  A. CARY JUDD.